United States Patent [19]

Huber et al.

[11] Patent Number: 4,919,354

[45] Date of Patent: Apr. 24, 1990

[54] APPARATUS FOR REPLACING ROLLS OF CUSTOMER FILMS IN COPYING MACHINES

[75] Inventors: Leonhard Huber, Glonn; Erich Nagel, Anzing; Bernd Payrhammer, Munich; Peter Lermann, Weyarn; Helmut Treiber, Munich; Herbert Wilsch, Unterhaching, all of Fed. Rep. of Germany

[73] Assignee: Agfa-Gevaert Aktiengesellschaft, Leverkusen, Fed. Rep. of Germany

[21] Appl. No.: 264,311

[22] Filed: Oct. 28, 1988

[30] Foreign Application Priority Data

Nov. 6, 1987 [DE] Fed. Rep. of Germany ....... 3737788

[51] Int. Cl.$^5$ ...................... B65H 19/28; B65H 75/28
[52] U.S. Cl. ................................. 242/67.3 R; 242/58; 242/74; 242/67.2
[58] Field of Search ............ 242/67.1 R, 67.2, 67.3 R, 242/58, 74, 57

[56] References Cited

U.S. PATENT DOCUMENTS

| | | | |
|---|---|---|---|
| 3,737,113 | 6/1973 | Yabe et al. | 242/74 X |
| 4,010,912 | 3/1977 | Dreher et al. | 242/67.1 R |
| 4,116,398 | 9/1978 | Roberts | 242/74 X |
| 4,159,807 | 7/1979 | Honsel et al. | 242/58 X |
| 4,175,713 | 11/1979 | Jores | 242/56 R |
| 4,360,170 | 11/1982 | Kuklies et al. | 242/56 R |
| 4,494,706 | 1/1985 | Becherer et al. | 242/67.1 R X |
| 4,553,712 | 11/1985 | Krywiczanin | 242/58 |
| 4,565,442 | 1/1986 | Benker et al. | 355/68 |
| 4,695,005 | 9/1987 | Gietman | 242/74 X |
| 4,770,361 | 9/1988 | Maeda | 242/67.1 R |
| 4,840,320 | 6/1989 | Shigeta et al. | 242/58 |

FOREIGN PATENT DOCUMENTS

| | | |
|---|---|---|
| 3043069 | 6/1982 | Fed. Rep. of Germany . |
| 3339618 | 5/1985 | Fed. Rep. of Germany . |

*Primary Examiner*—John M. Jillions
*Attorney, Agent, or Firm*—Peter K. Kontler

[57] ABSTRACT

A photographic copying machine wherein the images of successive frames on a long roll of spliced-together exposed and developed customer films are copied while successive films are advanced stepwise from a supply reel on a first driven mandrel toward and is convoluted on a takeup reel on a second driven mandrel. The copying machine employs a third mandrel which can support a fresh roll in the plane of the roll on the first mandrel, and a fourth mandrel which can support an empty takeup reel in the plane of the rotating takeup reel. The leader of the fresh roll is located adjacent the film path ahead of the copying station and is automatically advanced into the range of an automatic attaching mechanism when the trailing end of the expiring roll has advanced beyond the copying station. The attaching mechanism secures the leader of the fresh roll to the core of the empty takeup reel, and the machine is then ready to make copies of frames forming part of the fresh roll. The filled takeup reel on the second mandrel is replaced with an empty takeup reel and a fresh roll is placed onto the first mandrel while the machine copies the frames of the roll which is supported by the third mandrel and is convoluted on the takeup reel on the fourth mandrel.

25 Claims, 3 Drawing Sheets

APPARATUS FOR REPLACING ROLLS OF CUSTOMER FILMS IN COPYING MACHINES

BACKGROUND OF THE INVENTION

The invention relates to apparatus for manipulating exposed and developed photographic films in copying machines, and more particularly to improvements in apparatus for manipulating relatively large rolls of exposed and developed customer roll films which are spliced together end-to-end so that each roll constitutes or includes a convoluted elongated web consisting of a large number of coherent customer roll films.

In order to operate a modern high-speed copying machine to capacity, it is necessary to rapidly replace a roll of copied photographic films with a fresh roll so that the length of intervals between copying of successive rolls of films is reduced to a minimum. In accordance with a presently known proposal, a fresh roll including a web of coherent exposed and developed customer films is maintained in a position of readiness adjacent the expiring roll so that the space previously occupied by the fully expired roll can be immediately occupied by the fresh roll in automatic response to axial shifting of the fresh roll toward the station for the roll which is being copied. The leader of the web of the fresh roll is attached to the core of a takeup reel before the web of the fresh roll is threaded into the copying machine, and the fresh roll and the associated takeup reel are held in positions of readiness in anticipation of expiration (completed copying) of the running web which then advances through the copying machine That portion of the fresh web which extends between the roll and the takeup reel is spaced apart from the path for the running web by a distance which at least equals the width of the web. Such apparatus employ two film guides, namely one for the running web (this film guide extends from the roll of expiring web to the takeup reel which collects the expiring web), and the other for the fresh web (this other film guide extends from the roll of fresh web to the takeup reel whose core or hub is connected with the leader of the fresh web). Once the copying of the running web is completed, the assembly of parts including the roll of fresh web, the takeup reel which is connected to the leader of the fresh web and the other film guide is shifted laterally so that the other film guide introduces the fresh web into the copying machine and the copying operation can be resumed. The one film guide, the empty support for the expired roll and the takeup reel which carries the expired (i.e., copied) roll are then adjacent one side of the running web and the filled takeup reel can be replaced with an empty takeup reel prior to threading of a further fresh web from the support, through the one film guide and on to the empty takeup reel. The assembly including the roll of further fresh web, the one film guide and the empty takeup reel is then maintained in a position of readiness for lateral shifting to the operative position as soon as the supply of the then running web is exhausted. The apparatus further comprises certain parts which must be caused to change their positions preparatory to removal of one of the film guides from its operative position and preparatory to advancement of the other film guide to the operative position. As a rule, the leader of a fresh web is threaded by hand so as to advance from the roll, through the corresponding film guide and to be attached to an empty takeup reel. Such mode of replacing copied webs necessitates practically continuous presence of at least one attendant at the copying station, and the space requirements of the apparatus are excessive; this is due primarily to the fact that the mechanism which is used to automatically shift the assembly of a fresh roll, a film guide and an empty takeup reel (with the leader of the web of the fresh roll attached thereto) is rather bulky. Moreover, the initial and maintenance costs of such apparatus are substantial.

OBJECTS AND SUMMARY OF THE INVENTION

An object of the invention is to provide a novel and improved apparatus for rapidly replacing copied rolls of coherent exposed and developed customer films with fresh rolls in copying machines wherein the images of film frames are reproduced onto photographic paper or other light-sensitive material.

Another object of the invention is to provide an apparatus which renders it possible to manipulate expiring and fresh rolls of coherent films in a small area and to automate the threading of fresh webs and the replacement of expired or copied rolls to an extent which is not possible in heretofore known apparatus.

A further object of the invention is to provide a method which renders it possible to dispense with the presence of attendants at the copying station for the express purpose of monitoring and/or initiating the replacement of expired rolls of photographic films with fresh rolls.

Still another object of the invention is to provide the apparatus with novel and improved means for supporting rolls of convoluted photographic films and takeup reels or other collecting devices for copied films in a space-saving manner.

A further object of the invention is to provide the apparatus with novel and improved means for attaching the leaders of webs to takeup reels.

Another object of the invention is to provide novel and improved takeup reels for use in the above outlined apparatus.

An additional object of the invention is to provide the apparatus with novel and improved means for threading the leaders of webs through the copying machine.

A further object of the invention is to provide the apparatus with novel and improved means for locating the leaders of fresh webs in optimum positions for threading through the copying machine upon completed copying of the running webs.

Another object of the invention is to provide an apparatus which need not employ several film guides.

A further object of the invention is to provide an apparatus which can be automated to any desired extent and to provide the apparatus with novel and improved means for ensuring that various steps in the course of a copying operation, as well as between successive copying operations, are carried out in an optimum sequence.

The invention resides in the provision of an apparatus replacing in a copying machine rolls of photographic films which are spliced together end-to-end into elongated webs. The apparatus comprises first and second supports (such as parallel horizontal mandrels) which serve to respectively carry and pay out discrete rolls of convoluted webs and to maintain the rolls thereon in a predetermined plane, guide means defining an elongated path which extends through the copying machine, means for advancing the leaders of the webs along the path, first and second holders for rotary web collecting devices downstream of the path (each such holder can include a rotary mandrel and each collecting device can comprise a takeup reel which can be driven by the respective mandrel), means for attaching the leaders of webs to collecting devices on the holders so that the collecting devices can draw the webs from the path, means for locating the leaders of webs adjacent a portion of the path in the range of the advancing means, and means for actuating the advancing means so that the leader which is adjacent the aforementioned portion of the path is automatically advanced along the path, through the copying machine and to the attaching means when the collecting device on one of the holders has completed the collecting of the web. The guide means preferably includes means for maintaining the web in the predetermined path in at least one second plane which is normal or substantially normal to the predetermined plane. The holders preferably include means for maintaining the collecting devices thereon in a common plane, preferably in a plane which coincides with the predetermined plane of rolls on the supports.

The locating means can comprise a carriage which is movable (for example, tiltable or pivotable) between a plurality of different positions, and the advancing means of such apparatus can comprise at least one first portion which is supported by the carriage and at least one second portion which is adjacent the carriage. The first and second portions of the advancing means cooperate in at least one position of the carriage to hold the leader of a web between them adjacent the aforementioned portion of the path. The carriage can include a member which is pivotable between two predetermined positions in each of which the first portion of the advancing means cooperates with the second portion to locate the leader of a web adjacent the aforementioned portion of the path. The first portion of the advancing means can include first and second rotors on the carriage and discrete drive means for each of the rotors. The second portion of the advancing means can comprise first and second idler rollers which are adjacent the carriage. The first rotor and the first idler roller define a nip for the leader of a first web in the first position of the carriage, and the second rotor and the second idler roller define a nip for the leader of a second web in the other position of the carriage. The drive means preferably include means for rotating the first rotor in a clockwise direction and means for rotating the second rotor in a counterclockwise direction. The locating means of such apparatus preferably further comprises means for yieldably maintaining the carriage in each of its first and second positions. For example, the arrangement may be such that the carriage is movable through a dead-center position on its way from the first to the second position and vice versa. The maintaining means of such locating means can include a coil spring or another resilient element which urges the carriage to the first position when the carriage is pivoted from the first position and beyond the dead-center position, and which urges the carriage to the second position when the carriage is pivoted from the first position beyond the dead-center position. Alternatively, the maintaining means can comprise a fluid-operated (especially pneumatic) motor. In addition, the locating means can comprise means for pivoting the carriage, e.g., a handle which can be manipulated by hand, or a servomotor which can be started in response to a signal from an evaluating circuit such as a microprocessor. Each rotor can comprise a driven shaft, a wheel on the shaft and a one-way clutch between the shaft and the wheel so that each wheel can be driven by the respective shaft and can rotate relative to the shaft if it is driven by other means (particularly by a running web) at a speed greater than the speed of the respective shaft. This is desirable and advantageous when the apparatus comprises means for rotating the collecting devices on the holders at a speed which is higher than the speed of the shafts for the wheels of the rotors on the carriage. The shafts for the wheels of the rotors are preferably arranged to drive the respective wheels independently of each other.

The guide means which defines the elongated path extending through the copying machine preferably includes at least one section or portion which is movable between a first position in which the respective portion of the path is closed to permit predictable threading of the leader of a web, and a second position in which the respective portion of the path is open, e.g., in order to permit a suitable loop former to convert a portion of the web in the path into a loop, particularly ahead of the copying station.

The apparatus preferably further comprises means for monitoring the web in the predetermined path and for generating signals in response to detection of the trailing end of the web. Such signals are used to actuate the advancing means so that the leader of a fresh web can be threaded into the path as soon as the trailing end of the previously copied web has been advanced beyond the range of the monitoring means. The monitoring means can be placed (or can operate) adjacent the path downstream of that path portion wherein successive frames of a web are copied while the web is caused to dwell between stepwise movements along the path.

The attaching means can comprise discrete levers or arms, one for each of the two holders, and means for pivoting the levers between spaced-apart first and second positions in which the levers are respectively adjacent a portion of the path ahead of the holders and adjacent the collecting devices on the respective holders. Each of the levers is provided with a gripper which is actuatable to engage the leader of a web in the first position of the respective lever and to release the leader of the web in the second position of the respective lever. Each collecting device can comprise a takeup reel having a core or hub adapted to be driven by the respective holder and being provided with means for engaging the leader of the web in response to pivoting of the respective lever from the first to the second position. Each takeup reel can further comprise two flanges which flank the respective hub, and each engaging means can comprise a flat which is provided on the respective hub and is parallel or nearly parallel to the axis of the respective takeup reel. Each such engaging means further comprises a protuberance which is provided on one of the flanges and is spaced apart from the flat and extends toward but short of the other flange, and a recess provided in the other flange and confronting the protuberance. A web which is trained over the protuberance in response to movement of the respective lever from the first to the second position is free to enter the recess and to thus slide over and beneath the protuberance so that it is convoluted on the hub in response to rotation of the takeup reel by the respective holder and while the respective gripper is actuated to release the leader of the web. The means for rotating the holders and the collecting devices on the holders can include discrete prime movers for the holders. Each of the grippers can comprise tongs and can include means (such as a magnet, especially an electromagnet) for opening and closing the tongs.

Alternatively, the attaching means can comprise a channel and means for moving the channel between two positions in one of which the channel directs the leader of a web from the path toward the core or hub of the collecting device (takeup reel) on one of the holders and in the other of which the channel directs the leader of a web from the path toward the core or hub of the collecting device on the other of the holders. Such cores or hubs are preferably provided with slots which receive the leaders of webs from the channel.

The apparatus preferably further comprises means for operating the advancing means, the aforementioned portion of the guide means, the locating means and the attaching means in a predetermined sequence. For example, the operating means can include a microprocessor which is caused (either automatically or by hand) to assume a condition of readiness during or subsequent to placing of a fresh roll onto one of the supports while a web advances from the roll on the other support along the path and is convoluted onto the collecting device on one of the holders. The operating means is preferably responsive to signals from the monitoring means to move the aforementioned portion of the guide means to operative position and to start the advancing means so as to advance the leader of a fresh web from the locating means, along the path and into the range of the attaching means as well as to actuate the attaching means so that the latter affixes the leader of the fresh web to an empty collecting device on the respective holder.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 7 is an enlarged view of a rotor of the means for advancing the leader of a fresh web along the film path in the copying machine of FIG. 1; and FIG. 8 is an enlarged view of the carriage for the rotor of FIG. 7.

DESCRIPTION OF PREFERRED EMBODIMENTS

Figure 1:
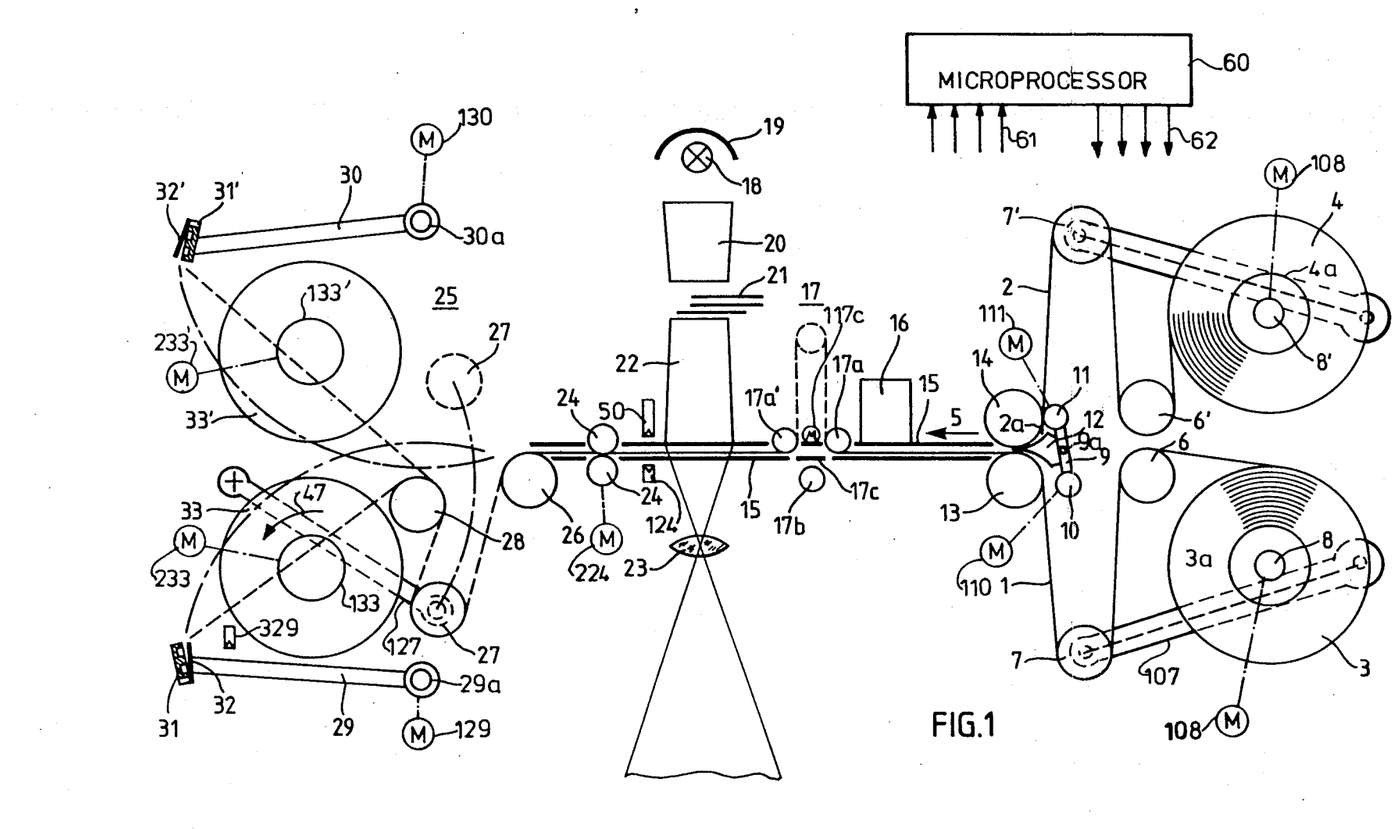
FIG. 1 is a schematic elevational view of a copying machine which embodies the improved apparatus.

Referring first to FIG. 1, there are shown certain components of a copying machine embodying an apparatus which serves to manipulate a succession of rolls each containing a large number of exposed and developed photographic customer roll films which are spliced together end-to-end, for example, in a manner as shown in commonly owned U.S. Pat. No. 4,565,442 granted Jan. 21, 1986 to Benker et al. for "Method of and apparatus for copying photographic originals". The disclosure of this patent is incorporated herein by reference.

FIG. 1 shows a running or expiring web 1 which is drawn off a first roll 3, and a second or fresh web 2 which is stored in the form of a second roll 4. The rolls 3, 4 are respectively mounted on discrete supports 8, 8' in the form of or including mandrels which can be rotated in directions to pay out the respective webs. The extent of frictional engagement between the cores 3a, 4a for the respective rolls 3, 4 and the peripheral surfaces of the corresponding supports 8, 8' suffices to ensure that the rolls are compelled to turn at the speed of their supports when the supports are set in rotary motion. FIG. 1 shows schematically a first variable-speed motor 108 for the support 8 and a second variable-speed motor 108' for the support 8'. These motors can be started and arrested in response to signals from the corresponding outputs 62 of an operating means 60 (e.g., a microprocessor) whose purpose will be described in greater detail hereinafter.

The running or expiring web 1 advances from the driven roll 3 along an elongated path which is defined by a film guide 15, and its leader 1a (FIG. 2) is connected to the core or hub 34 (see FIGS. 3-4) of a film collecting device 33 in the form of a takeup reel which further comprises two disc-shaped flanges 35, 36 (FIG. 4) flanking the hub 34. The latter is mounted on and receives torque from a holder 133 which is driven by a variable-speed electric motor 233 in a direction (arrow 47) to ensure that the takeup reel 33 can draw the web 1 along the path which is defined by the film guide 15 and extends through the copying machine. The direction in which the web 1 is advanced along its path is indicated by the arrow 5.

The film guide 15 comprises a guide roller 6 which cooperates with an idler roller 13 and a dancer roll 7 to provide the web 1 with a loop between the rollers 6 and 13, the dancer roll 7 being located in the bight of the loop. The dancer roll 7 is mounted on a mobile carrier 107 (e.g., a pivotable lever) and can rest on the web 1 between the rollers 6, 13 solely by gravity or by gravity as well as under the action of one or more springs, not shown. The idler roller 13 is located at the upstream end of a straight portion of the elongated film path for the running web 1, and such straight portion of the film path extends through the printing or copying station.

The leader of the fresh web 2 is trained over a guide roller 6' a dancer roll 7' and an idler roller 14. The elements 6', 7' and 14 are mirror images of the elements 6, 7 and 13 with reference to a horizontal plane wherein the web 1 advances from the idler roller 13 toward the takeup reel 33. The leader 2a of the fresh web 2 is located by a rotor 11 which is mounted on a pivotable carriage 9 in the form of a wiper adjacent the idler rollers 13 and 14. The carriage 9 further supports a second rotor 10 which can cooperate with the idler roller 13 to locate the leader of a further web (not shown) which replaces the web 1 when the supply of spliced-together customer films which jointly form the expiring roll 3 on the support 8 is exhausted. The carriage 9 is shown in that one of its two end positions in which the rotor 11 cooperates with the idler roller 14 to define a closed nip for and locate the leader 2a of the fresh web 2 in a position adjacent a portion of the path of movement of the running web 1.

In accordance with a feature of the invention, the mandrels of the supports 8 and 8' constitute a means for maintaining the rolls 3 and 4 in a common vertical plane, and such plane is normal to the (generally horizontal) plane of the running web 1 between the idler roller 13 and the takeup reel 33. The speed at which the web 1 is normally advanced stepwise along its path is determined by two advancing rolls 24 which define a nip for the web 1 downstream of the copying station. The motor 108 drives the roll 3 at a speed which corresponds (at least on the average) to the speed of the rolls 24 so that the web 1 is under tension and is looped by the dancer roll 7.

The carriage 9 is pivotable in the frame of the copying machine about a horizontal shaft 9a (see particularly FIG. 8) and includes a substantially wedge-like portion 12 which extends into the space between the idler rollers 13, 14 so that it can deflect the leader 2a of the web 2 into the horizontal portion of the film path when the supply of photographic films on the support 8 has expired and a motor 111 (FIG. 7) for a shaft 11a of the rotor 11 has received a signal (from an output 62 of the microprocessor 60) to rotate the rim or wheel 11b of the rotor 11 in a counterclockwise direction. The rotor 11 further comprises a one-way clutch (freewheel) 11c which is disposed between the shaft 11a and the wheel 11b and enables the wheel 11b to rotate at a speed exceeding that of the shaft 11a when the web 2 is pulled by a second collecting device or takeup reel 33' on a second driven holder 133'. The rotor 10 on the carriage 9 is identical with the rotor 11 except that the motor for its shaft can be operated to rotate the wheel of the rotor 10 in a clockwise direction so as to cooperate with the idler roller 13 in advancing the leader of a fresh web which replaces the web 1 when the trailing end of the web 1 has been caused to advance beyond the copying station. If the rotor 10 is to cooperate with the idler roller 13, the carriage 9 must be pivoted to its other end position in which the rotor 11 is remote from the idler roller 14. A handle 9b is provided to facilitate pivoting of the carriage 9 between its end positions. Alternatively, the handle 9b can be replaced by or can be provided jointly with a servomotor which receives signals from an output 62 of the microprocessor 60 to pivot the carriage 9 between its two end positions.

The rotors 10, 11 constitute a first portion, and the idler rollers 13, 14 constitute a second portion of a means for advancing the leaders of successive fresh webs from positions adjacent the straight portion of the film path on toward the advancing rolls 24 and into the range of an attaching device 25 which is designed to automatically secure the leaders of fresh webs to the cores or hubs of empty takeup reels.

FIG. 8 shows one of the means which can be used to yieldably maintain the carriage 9 in the selected end position. This carriage is movable between its two end positions and through an intermediate or dead-center position (shown in FIG. 8) on its way from one end position (in which the rotor 11 cooperates with the idler roller 14) toward the other end position (in which the rotor 10 cooperates with the idler roller 13) or vice versa A coil spring 109 is attached to a stud 109a on the wedge-like portion 12 and to a stud 109b in the frame of the copying machine. The spring 109 causes the carriage 9 to snap over from the dead-center position to the one or the other end position as soon as the carriage is moved only slightly beyond the dead-center position and irrespective of whether such pivoting is effected by the handle 9b or by a servomotor in response to a signal from the corresponding output 61 of the microprocessor 60. It is further possible to replace the handle 9b with a fluid-operated (e.g., pneumatic) motor whose operation can be initiated by hand or by a signal from the microcomputer 60. The selection of means for pivoting the carriage 9 and of its projection 12 will depend upon the desired or required degree of automation of the improved apparatus.

The copying machine further includes a customary density measuring station for a scanner 16 which ascertains the density of each film frame in the three primary colors and transmits appropriate signals to the corresponding input or inputs 61 of the microprocessor 60 or to a discrete computer of the copying machine. The scanner 16 is shown and described in greater detail in the aforementioned commonly owned U.S. Pat. No. 4,565,442 to Benker et al. Successive frames of the web 1 then advance through a magazine 17 including a loop former having three rollers 17a, 17a' and 17b. The purpose of the loop former or magazine 17 is to ensure that a relatively large number of scanned film frames can be disposed ahead of the printing or copying station even if the scanner 16 is located in close or practically immediate proximity of the copying station. The rollers 17a, 17a' are installed in the frame of the copying machine for rotation about fixed axes, and the roller 17b is a dancer roll which is movable between the solid-line and broken-line positions of FIG. 1 upon completed removal or displacement of a portion 17c of the film guide 15. The portion 17c is held in the illustrated position during threading of the leader of a web along the straight portion of the film path but is thereupon removed or moved out of the way to provide room for movement of the roller (dancer roll) 17b from the solid-line to the broken-line position. The means for moving the portion 17c of the film guide 15 to and from the illustrated position includes a motor 117c which receives signals from the corresponding output of the microprocessor 60. The manner in which the preferably U-shaped portion 17c of the film guide 15 is movable to and from its operative position is or can be the same as, or similar to, that disclosed in German Pat. No. 33 39 618. The motor 117c can move the portion 17c of the film guide 15 at right angles to the plane of FIG. 1, for example, toward the observer of FIG. 1 in order to enable the portion 17c to assume its operative position and rearwardly and away from the observer of FIG. 1 in order to provide room for movement of the roller 17b from the solid-line to the broken-line position of FIG. 1 or vice versa.

The copying machine further comprises a light source 18 which is located in front of a reflector 19 and directs radiation into a first duct 20 ahead of a gap between the duct 20 and a mixing duct 22. The gap between the ducts 20, 22 can receive subtractive color filters 21 which are reciprocable along customary guides (not shown in FIG. 1). The image of the film frame which is adjacent the lower end of the mixing duct 22 is focused by an objective 23 onto a web of photographic paper (not shown) in a manner well known from the art of copying machines for film frames. Reference may be had, again, to the aforementioned commonly owned patent to Benker wherein FIG. 1 shows all necessary details of a complete copying machine including a source of photographic paper and means for advancing such paper from the source to a takeup spool.

The improved apparatus further comprises means (e.g., a photocell 124) for monitoring the perforations on the running web 1 and for transmitting to the corresponding input 61 of the microprocessor 60 signals which are used to control the operation of the advancing rolls 24 downstream of the copying or printing station, i.e., downstream of the mixing duct 22. The perforations (or other suitable indicia on the web 1 in the film path) are distributed in such a way that a fresh film frame is in register with the duct 22 and with the objective 23 of the copying machine when the photocell 124 detects an oncoming perforation. The web 1 is then arrested in an optimum position for copying of the image on the film frame between the mixing duct 22 and the objective 23. The rolls 24 are thereupon set in motion to advance the next film frame into the copying or printing station. Such intermittent movements of the web 1 in the film path are initiated by signals from the photoelectronic transducer of the photocell 124 which transmits signals to the microprocessor 60 and the latter, in turn, transmits signals to the motor 224 for one of the advancing rolls 24. The other advancing roll 24 can be biased toward the one advancing roll by one or more springs in a manner as is customary in connection with the transport of webs or strips of photographic films in copying and other machines.

The attaching means 25 serves to couple the leaders of webs 1, 2, etc. to successive empty takeup reels on the holders 133, 133,. These holders can be driven by the aforementioned discrete motors 233, 233' in response to signals from the microprocessor 60 and can include mandrels which are in frictional contact with the internal surfaces of the cores or hubs 34 of the respective takeup reels. FIG. 1 shows that the takeup reel 33 on the mandrel of the holder 133 is in the process of pulling the web 1 downstream of the advancing rolls 24 because the motor 233 is on and tends to rotate the takeup reel 33 in a counterclockwise direction (arrow 47).

The attaching means 25 comprises two idler rollers 26, 28 which are rotatable in the frame of the copying machine about fixed axes, and a dancer roll 27 which is mounted on an arm 127 and is movable by a suitable motor (not shown) in response to signals from the corresponding output 62 of the microprocessor 60 between the solid-line and broken-line positions of FIG. 1. When in the solid-line position, the dancer roll 27 causes the web 1 to form a loop between the idler rollers 26, 28 immediately or closely ahead of the holder 133 for the takeup reel (collecting device) 33. Looping of the web 1 ahead of the takeup reel 33 ensures a more predictable and more uniform winding of the web 1 on the core or hub 34 of the takeup reel 33.

Figure 2:
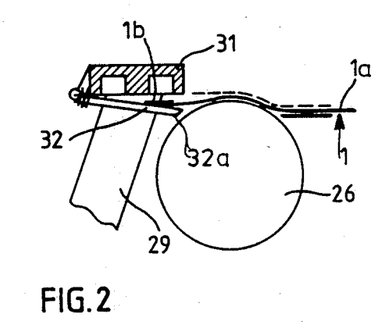
FIG. 2 is an enlarged view of a detail of the attaching means in the apparatus of FIG. 1.
Figure 3:
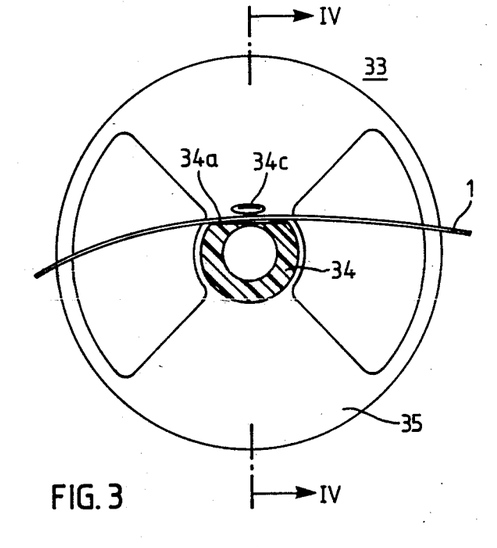
FIG. 3 is an enlarged sectional view of a collecting device which can be used in the apparatus of FIG. 1, the section being taken in the direction of arrows as seen from the line III—III of FIG. 4.
Figure 4:
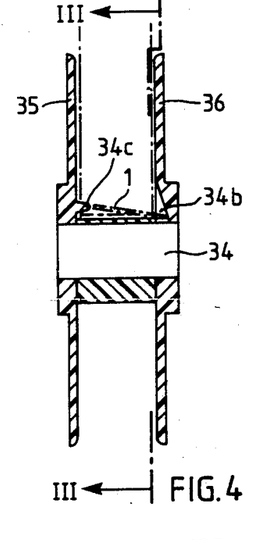
FIG. 4 is a sectional view as seen in the direction of arrows from the line IV—IV of FIG. 3.

The details of the takeup reel 33 are shown in FIGS. 3 and 4. This takeup reel can be made of a suitable plastic material and includes the aforementioned core or hub 34 which can be slipped onto and is then in adequate torque-receiving frictional engagement with the mandrel of the holder 133. The hub 34 is flanked by the disc-shaped flanges 35, 36 at least one of which (particularly the flange 36) is optional. The external surface of the hub 34 has a rather pronounced flat 34a which is parallel to the axis of the takeup reel 33 and is partially overlapped by a relatively short protuberance 34c extending from the inner side of the flange 35 toward the inner side of the flange 36 in rather close proximity to the flat 34a. The length of the protuberance 34c (as measured in the axial direction of the hub 34) need not exceed one-eighth of the width of the web 1. The inner side of the flange 36 is formed with a recess 34b which confronts the protuberance 34 and has a depth which matches or approximates the length of the protuberance in the axial direction of the hub 34. A flat on the hub of a takeup reel is shown in German Offenlegungsschrift No. 30 43 069. The outer side of the protuberance 34c is or can be convex and preferably slopes toward the flat 34a in a direction toward the inner side of the flange 36 so as to promote a sliding movement of the leader 1a of the web 1 along such outer side and toward the recess 34b in order to ensure that the leader of the web 1 will slide off the protuberance 34c and will enter the relatively narrow clearance of gap between the inner side of the protuberance and the adjacent portion of the flat 34a in response to turning of the takeup reel 33. The depth of the recess 34b preferably increases in a direction toward the axis of the hub 34 so as to even further promote a lateral movement of the leader 1a of the web 1 off the protuberance 34c and into engagement with the flat 34a at the inner side of the protuberance. If the tip 1b (FIG. 2) of the leader 1a of the web 1 is held against forward movement while a portion of the leader 1a behind the tip 1b extends into the clearance between the protuberance 34c and the flat 34a, and the motor 233 drives the takeup reel 33 through the medium of the holder 133, the leader 1a of the web 1 is convoluted around the hub 34 and the protuberance 34c in response to one or more revolutions of the takeup reel 33, and such leader is firmly attached to the hub 34 so that the tip 1b can be released since the web 1 is then ready to be positively beyond the idler roller 28 as soon as and as long the takeup reel 33 is driven in the direction of arrow 47. The outermost convolution of the leader 1a of the web 1 on the hub 34 will assume the shape of a perfect cylinder in response to a small number of revolutions of the takeup reel 33 even though the convolutions of the leader 1a also surround the protuberance 34c. In fact, the protuberance 34c contributes to the ability of the leader 1a to form practically cylindrical revolutions because it overlies a portion of the hub 34 radially outwardly of the flat 34a.

The attaching means 25 further comprises two levers or arms 29, 30 which are pivotable in the frame of the copying machine, as at 29a and 30a, and can be pivoted by discrete reversible motors 129, 130 which receive signals from the corresponding output or outputs 62 of the microprocessor 60. The latter further controls grippers or tongs 31, 32 and 31', 32' which are respectively provided at the free ends of the levers 29, 30. The gripper 31, 32 comprises an armature 31 and a magnetizable claw or jaw 32 which can be attracted or repelled by the armature 32 in response to energization or deenergization of the electromagnet including the parts 31, 32. Signals for energization and deenergization are transmitted by the corresponding output 62 of the microcomputer 60. The construction of the gripper 31', 32' at the free end of the lever 30 is preferably identical with that of the gripper on the lever 29.

When the leader of a web (such as the leader 1a of the web 1) is to be attached to the hub 34 of an empty takeup reel, the lever 29 or 30 is pivoted to a first end position (note the end position of the lever 29 in FIG. 2) in which the respective gripper (31, 32 in FIG. 2) is open because the electromagnet is deenergized. The tip 1b of the leader 1a of the web 1 is then clamped by the jaw 32 in response to energization of the electromagnet 31, 32 and the lever 29 is pivoted by the respective motor (129 for the lever 29) to the other end position in which the leader 1a of the web 1 overlies the hub 34 of the empty takeup reel 33 on the holder 133. The motor 233 is already in motion or is set in motion to rotate the takeup reel 33 while the gripper 31, 32 of the lever 29 maintains the tip 1b of the leader 1a of the web 1 at a standstill in the solid-line position of the arm 29 (as seen in FIG. 1). This results in slippage of the leader 1a along the protuberance 34c and entry of the leader 1a into the clearance between the protuberance 34c and the flat 34a before the leader 1a begins to form convolutions on the hub 34 in response to further rotation of the takeup reel 33 in the direction of arrow 47. The electromagnet or gripper 31, 32 is then deenergized so that the tip 1b of the leader 1a is released because the leader 1a is properly attached to the hub 34 and is drawn beyond the idler roller 28 as long as the takeup reel 33 is driven by the motor 233.

The construction and mode of operation of the lever or arm 30 and its gripper 31', 32' are analogous to the just described construction and mode of operation of the lever 29 and its gripper 31, 32. The only difference is that, during movement from its first end position (adjacent the roller 26) toward its other end position (shown in FIG. 1 by solid lines), the lever 30 moves the leader of a fresh web toward engagement with the hub 34 of another empty takeup reel, such as the takeup reel 33' on the holder 133'. The takeup reel 33' is maintained in a position of readiness to be attached to the leader 2a of the web 2 as soon as the copying of film frames on the web 1 is completed, i.e., as soon as the supply of web 1 forming the roll 3 is exhausted and the trailing end of the web 1 has advanced beyond a sensor or monitoring device 50 which is connected with an input 61 of the microprocessor 60 and is located between the mixing duct 22 and the advancing rolls 24.

Referring again to FIG. 2, it will be noted that the claw or jaw 32 of the gripper at the free end of the lever 29 has a chamfered edge portion 32a which is closely adjacent but still spaced apart from the peripheral surface of the idler roller 26 when the lever 29 is held in the illustrated end position. This enables the chamfered edge portion 32a to act not unlike a doctor blade which directs the tip 1b of the oncoming leader 1a of the web 1 into the pocket between the parts 31, 32 of the gripper before the electromagnet which constitutes or includes this gripper is energized in response to a signal from the microprocessor 60 in order to ensure that the tip 1b is firmly engaged and the lever 29 can pull the leader 1a of the web 1 during movement of the lever 29 from the solid-line position of FIG. 2 to the solid-line position of FIG. 1. When the lever 29 is held in the end position of FIG. 2, its claw or jaw 32 is substantially tangential to the peripheral surface of the idler roller 26.

The leader 1a of the web 1 does not or need not carry any exposed and developed film frames. Such leader can be attached (e.g., welded) to the front end portion of the foremost exposed and developed photographic roll film of the web 1 and ensures that the frames of the foremost roll film are not damaged during attachment of the leader 1a to the takeup reel 33.

The mandrels of the holders 133, 133' preferably maintain the respective takeup reels 33, 33' in a common plane which preferably coincides with the common plane of the rolls 3, 4 on the mandrels of the supports 8 and 8'. This reduces the floor space requirements of the improved apparatus.

The operation is as follows:

It is assumed that neither of the supports 8, 8' carries a roll of coherent exposed and developed photographic roll films but that the holders 133, 133' respectively carry empty takeup reels (collecting devices) 33 and 33'. If the copying machine is to be put to use, the roll 3 (which has been delivered from a developing machine) is mounted on the support 8 and its leader 1a is trained over the idler roller 6 and dancer roll 7 and is introduced into the (then open) nip of the rotor 10 and idler roller 13. The handle 9b is then actuated to move the carriage 9 to that end position in which the coil spring 109 biases the peripheral surface of the rim or wheel of the rotor 10 against the tip 1b of the leader 1a adjacent the foremost portion of the straight or substantially straight stretch of the film path next to the wedge-like portion 12 of the carriage 9. The leader 1a (which can be made of a suitable flexible plastic material capable of being affixed to the foremost customer film in response to the application of heat and/or pressure or in any other suitable way) is attached to the foremost customer film of the web 1 before or after the roll 3 is mounted on the support 8.

The motor 110 for the shaft of the rotor 10 is then set in motion so that the tip 1b of the leader 1a is caused to advance past the wedge-like portion 12 of the carriage 9 and on beyond the scanner 16 and the magazine or loop former 17. At such time, the mobile portion 17c of the film guide 15 is maintained in the illustrated operative position so that the tip 1b of the leader 1a can advance past the idler rollers 17a, 17a' (the roller 17b is held in the solid-line position of FIG. 1) and into the nip of the advancing rolls 24. The leader 1a then overlies a suitable copying platform (not specifically shown) between the mixing duct 22 and the objective 23 of the copying machine. At such time, the dancer roll 27 of the attaching means 25 is maintained in the broken-line position of FIG. 1. The advancing rolls 24 are or can be set in motion in response to a signal from the microprocessor 60 not later than when the tip 1b of the leader 1a enters the nip of these advancing rolls (as mentioned above, it suffices to positively drive one of the rolls 24 and to cause the other roll 24 to bear against the one roll or against a web between the rolls 24). The tip 1b is advanced into the pocket between the parts 31, 32 of the gripper at the free end of the lever 29 which is then maintained in the end position of FIG. 2. The copying operation can begin as soon as the tip 1b of the leader 1a enters the pocket of the gripper 31, 32, i.e., the length of the leader 1a should suffice to ensure that the foremost frame of the foremost customer film forming part of the web 1 does not reach the mixing duct 22 before the tip 1b is properly engaged by the gripper of the lever 29. The microprocessor 60 then causes the motor 129 to pivot the lever 29 to the solid-line position of FIG. 1 (while the gripper 31, 32 clamps the tip 1b). The tip 1b advances along an arcuate path a portion of which extends between the idler rollers 26, 28 on the one hand and the dancer roll 27 on the other hand. The motor 224 drives one of the rolls 24 at a peripheral speed which matches the speed of movement of the lever 29 from the solid-line end position of FIG. 2 to the solid-line end position of FIG. 1. A motor (not shown) can cause the arm 127 for the dancer roll 27 to move the dancer roll 27 from the broken-line position to the solid-line position of FIG. 1 as soon as the gripper 31, 32 had advanced beyond the gap between the idler rollers 26, 28 of the attaching means 25.

The motor 117c then retracts portion 17c of the film guide 15 from the position of FIG. 1 in response to a signal from the microprocessor 60, and the dancer roll 17b is moved from the solid-line position to the broken-line position of FIG. 1 so as to provide the web 1 with a loop between the scanner 16 and the mixing duct 22. The motor for the dancer roll 17b can include a spring which stores energy when the dancer roll 17b is held in the solid-line position but is permitted or caused to dissipate energy in response to retraction of the mobile portion 17c of the film guide 15.

The foremost frames of the first customer film which forms part of the web 1 enter the magazine 17 upon completion of density measurement by the scanner 16, and the foremost frame in the magazine 17 is ready for advancement to the actual copying or printing station between the mixing duct 22 and the objective 23. The web 1 is tensioned because the takeup reel 33 tends to draw the web 1 off the roll 3 on the support 8. The leader 1a of the web 1 (behind the tip 1b which is held by the gripper 31, 32 of the lever 29 while the latter assumes the solid-line position of FIG. 1) is caused to slide off the protuberance 34c on the flange 35 of the takeup reel 33 which is rotated by the motor 233 by way of the holder 133) so that the leader 1a is automatically attached to the hub 34 and the gripper 31, 32 is free to release the tip 1b after the takeup reel 33 completes a preselected number of revolutions which suffice to ensure that the leader 1a is reliably attached to the hub 34. As the takeup reel 33 rotates in the direction of arrow 47 and winds the leader 1a of the web 1 around its hub 34, the lever 29 is pulled from the end position which is shown in FIG. 1 (i.e., the lever 29 is compelled to pivot in a clockwise direction) and thereby induces a detector 329 (e.g., a photocell) to transmit to the microprocessor 60 a signal which initiates an opening of the gripper 31, 32 at the free end of the lever 29. The length of the leader 1a can vary within a wide range and is selected primarily with a view to ensure that the attachment of the leader 1a to the hub 34 of the takeup reel 33 is completed without affecting the integrity of exposed and developed film frames on the foremost customer film of the web 1.

The copying operation then progresses in the customary way, i.e., the rolls 24 advance the web 1 in stepwise fashion in response to signals which are generated by the photocell 124. It will be recalled that this photocell monitors perforations or other indicia which are provided in or on the web 1, one for each film frame. This ensures that the web 1 repeatedly comes to a halt in response to advancement of successive film frames into the copying or printing station.

If the improved apparatus is not equipped with means for automatically delivering fresh rolls to the supports 8 and 8', a person in charge can place a fresh roll 4 onto the support 8' as soon as the copying of film frames on the web 1 begins. The leader 2a of the web 2 which forms the roll 4 is then trained over the idler roller 6' and over the dancer roll 7' and is introduced into the open nip of the rotor 11 and idler roller 14 before the carriage 9 is caused to assume the position which is shown in FIG. 1 to thereby locate the leader 2a adjacent a predetermined portion of the film path. As mentioned above, the carriage 9 can be pivoted to the position of FIG. 1 by hand (handle 9b) or in response to a signal from the microprocessor 60 which can receive a signal from a device (not shown) serving to monitor the presence or absence of the leader of a web in the nip of the rotor 11 and idler roller 14. The rotor 11 is then at a standstill so that the tip of the leader 2a remains in an optimum position adjacent the respective side of the wedge-like portion 12 of the carriage 9.

When the trailing end of the web 1 advances beyond the mixing duct 22, the monitoring device 50 transmits a signal to the microprocessor 60. Instead of employing a discrete monitoring device 50, the scanner 16 of the copying machine can be designed to transmit to the microprocessor 60 a signal which denotes that the trailing end of the web 1 has been advanced beyond the copying station. The microprocessor 60 permits or compels the motor 233 to complete the winding of the web 1 onto the takeup reel 33, and the microprocessor further transmits signals which are necessary to prepare the apparatus for transport of the tip of the leader 2a of the fresh web 2 for advancement into the attaching means 25, i.e., adjacent the idler roller 26 so that the tip of the leader 2a assumes a position corresponding to that of the tip 1b of the leader 1a in the pocket of the gripper 31, 32 (FIG. 2). Such preparation involves retraction of the dancer roll 17b to the solid-line position of FIG. 1 and actuation of the motor 117c so as to return the portion 17c of the film guide 15 to the operative position of FIG. 1 in which the corresponding portion of the film path is closed and the leader 2a of the web 2 can readily advance along the film path on toward the idler roller 26 of the attaching means 25. If necessary, the microprocessor 60 further transmits a signal which is used to change the position and/or orientation of the aforementioned copying platform. In the next step, the microprocessor 60 starts the motor 111 so that the rim or wheel 11b of the rotor 11 is driven in a counterclockwise direction in order to advance the tip of the leader 2a past the scanner 16, idler rollers 17a, 17a' and mixing duct 22 into the nip of the advancing rolls 24. Still further, the microprocessor 60 causes the motor 130 to pivot the lever 30 from the solid-line position of FIG. 1 to a position which is a mirror image of the position of the lever 29 in FIG. 2 so that the gripper 31', 32' is ready to receive and engage the tip of the leader 2a before the lever 30 is caused to return to the solid-line position of FIG. 1 subsequent to closing of the gripper 31', 32' so that the leader 2a can be automatically attached to the core or hub of the empty takeup reel 33' on the holder 133' in a manner analogous to that described above in connection with attachment of the leader 1a to the hub 34 of the takeup reel 33. The rolls 24 advance the tip of the leader 2a into the pocket of the gripper 31', 32' in the same way as described above for the tip 1b of the leader 1a, and the copying of frames on the films of the web 2 then proceeds in stepwise fashion. The operator replaces the loaded takeup reel 33 with an empty takeup reel and places a fresh roll (not shown) onto the support 8. The leader of the web which forms the fresh roll on the support 8 is then trained over the idler roller 6 and dancer roll 7 and is introduced into the nip of the rotor 10 and idler roller 13. The preparation for threading of the leader of such fresh web is then completed and the threading can begin as soon as the monitoring means 50 or the scanner 16 signals the detection of the trailing end of the web 2.

The manner in which a freshly developed web can be convoluted onto a spool or core to form a roll (such as the roll 3 or 4 of FIG. 1) can be the same as disclosed in commonly owned U.S. Pat. No. 4,494,706 granted Jan. 22, 1985 to Becherer et al. for "Apparatus for convoluting strips of photosensitive material or the like."

An important advantage of the improved apparatus is that an operator or an automatic roll supplying device has ample time to properly locate a fresh roll on the support 8 or 8' and to replace a loaded takeup reel with an empty takeup reel while the machine is in the process of making prints from the frames of a web which is running from the support 8 or 8' toward the takeup reel on the holder 133 or 133'. Moreover, ample time remains for proper threading of the leader of a fresh web from the support 8 or 8' to the location which is determined by the rotor 10 in conjunction with the idler roller 13 or by the rotor 11 in conjunction with the idler roller 14. All the operator has to do is to introduce the leader of a fresh web into the apparatus so that the tip of the leader is located in the region of the wedge-like portion 12 of the carriage 9, and to manually or otherwise pivot the carriage 9 to a position in which the leader of the fresh web is clamped between the rotor 10 and the idler roller 13 or between the rotor 11 and the idler roller 14. The placing of a fresh roll onto the support 8 or 8', the replacement of a loaded takeup reel with an empty takeup reel, and the threading of the leader of the fresh web from the roll on the support 8 or 8' to the carriage 9 can be completed within a small fraction of the time which is required to make copies of all frames on the customer films which jointly form a roll.

Figure 5:
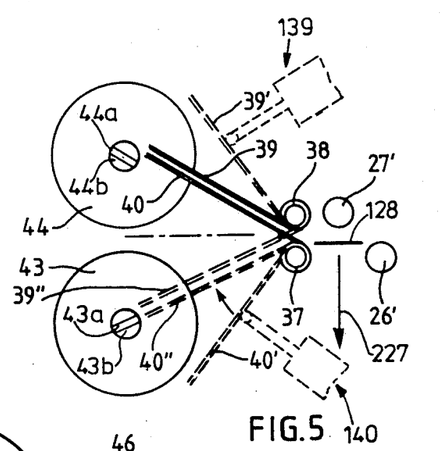
FIG. 5 is an elevational view of two modified collecting devices and of modified means for attaching the leaders of webs to such collecting devices.

FIG. 5 shows a portion of modified attaching means which can be utilized in lieu of the attaching means 25 of FIGS. 1 and 2. Thus, the levers 29, 30 can be replaced with a channel including two walls or cheeks 39, 40. The idler roller 28 of FIG. 1 is replaced with a pair of idler rollers 37, 38 which are located downstream of an idler roller 26' and a dancer roll 27'. The latter can be caused to loop a freshly attached web in response to retraction of a portion 128 of a film guide which is held in the solid-line position of FIG. 5 during advancement of the tip of the leader of a fresh web into the space between the idler rollers 37, 38 but is then retracted (e.g., in a manner as described above in connection with the portion 17c of the film guide 15 shown in FIG. 1) so as to enable the dancer roll 27' to descend in the direction of arrow 227 and to loop the leader of the fresh web between the idler rollers 26', 37. The channel including the walls 39, 40 define a narrow path which compels the tip of the leader of a fresh web to enter a substantially diametrically extending slot 43a in the core or hub 43b of the empty takeup reel 43 on the respective holder or the substantially diametrically extending slot 44a in the core or hub 44b of the takeup reel 44 on the respective holder, depending on selected orientation of the channel 39, 40. The walls 39 and 40 assume the solid-line positions of FIG. 5 when the tip of the leader of a fresh web is to be introduced into the slot 44a, and such walls assume the positions 39'', 40'' when the channel is to direct the tip of the leader of a web into the slot 43a. The walls 39, 40 are thereupon pivoted relative to each other (such as to the positions which are shown at 39' and 40') so as to be moved out of the way and to permit an advancing web to form a growing roll on the core or hub 43b or 44b. The means for pivoting the walls 39, 40 with and relative to each other can comprise fluid-operated (e.g., pneumatic) motors 139, 140 which are shown only schematically and can be actuated in response to signals from the microprocessor (not shown in FIG. 5). The right-hand end portions of the walls 39, 40 can be caused to move along arcuate paths having their centers of curvature on the axes of the respective idler rollers 38, 37. The momentary positions of the walls 39, 40 can be monitored by mechanical, optical or other suitable means (not shown) so that the microprocessor invariably contains information denoting the momentary positions of these walls.

Figure 6:
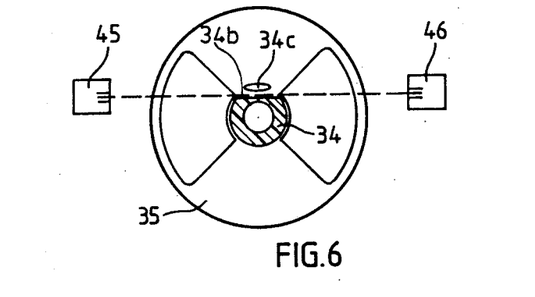
FIG. 6 is a smaller-scale view of the collecting device of FIG. 3 and further shows a detector which monitors the core or hub of a collecting device for the presence or absence of convoluted web.

FIG. 6 shows a monitoring device in the form of a photocell having a radiation source 45 and a transducer 46. The beam of radiation which issues from the source 45 passes intermittently through the clearance between the protuberance 34c and the flat 34a on the hub 34 of the takeup reel which is shown in FIG. 6 when the takeup reel is rotated by the respective motor. The purpose of the monitoring device 45, 46 is to test or inspect the supposedly empty takeup reel, i.e., to ascertain whether or not the takeup reel is ready to be connected with the leader of a fresh web. If the takeup reel carries a number of convolutions, the path for the propagation of radiation from the source 45 to the transducer 46 is interrupted at all times and the transducer 46 signals to the microprocessor that the takeup reel which is supposed to be connected with the leader of a fresh web is not ready for such operation. If a takeup reel is absent, the beam of radiation from the source 45 to the transducer 46 is not interrupted at all. This is signaled to the microprocessor which can cause a suitable display unit to indicate that an empty takeup reel must be placed onto the respective holder. Such display unit can also inform the operator that the takeup reel which is supposed to be connected with the leader of a fresh web already carries a roll of convoluted photographic films. However, if the takeup reel is empty and is properly mounted on its holder, it causes the transducer 46 to generate signals at a frequency which is a function of rotational speed of the takeup reel. Such signals are evaluated by the microprocessor which then permits the apparatus to proceed with advancement of the leader of a fresh web to the idler roller 26 and a pivoting of the lever 29 or 30 to a position for clamping of the tip of the leader of such web by the gripper 31, 32 or 31', 32'.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Apparatus for replacing in a copying machine rolls of photographic films which are spliced together end-to-end into elongated webs, comprising first and second supports arranged to respectively carry and pay out discrete rolls of convoluted webs and to maintain the rolls thereon in a common plane; guide means defining an elongated path which extends through the copying machine; means for advancing the leaders of webs along said path; first and second holders for rotary web collecting devices downstream of said path; means for attaching the leaders of webs to collecting devices on said holders so that the collecting devices can draw the webs from the path; means for locating the leaders of webs adjacent a portion of said path in the range of said advancing means, including a carriage which is movable between a plurality of different positions, said advancing means including at least one first portion which is supported by said carriage and at least one second portion adjacent said carriage, said first and second portions of said advancing means cooperating in at least one position of said carriage to hold the leader of the web between them adjacent said portion of said path; and means for actuating said advancing means so that the leader which is adjacent said portion of said path is automatically advanced along said path to said attaching means when the collecting device on one of said holders has completed the collection of a web.

2. The apparatus of claim 1, wherein said guide means includes means for maintaining the web in said path in at least one second plane which is normal or substantially normal to said common plane.

3. The apparatus of claim 1, wherein said holders include means for maintaining the collecting devices thereon in a common plane.

4. The apparatus of claim 3, wherein the common plane for the collecting devices coincides with the common plane for the rolls on said supports.

5. The apparatus of claim 1, wherein said carriage includes a member which is pivotable between two predetermined positions in each of which said first portion cooperates with said second portion to locate the leader of a web adjacent said portion of said path.

6. The apparatus of claim 1, wherein said guide means includes at least one portion which is movable between a first position in which the respective portion of the path is closed and a second position in which the respective portion of said path is open.

7. The apparatus of claim 1, further comprising means for monitoring the web in said path and for generating signals in response to detection of the trailing end of the monitored web, said actuating means including means for actuating said advancing means in response to said signals.

8. The apparatus of claim 7, wherein said path includes a predetermined portion wherein the web in said path is copied, said monitoring means being adjacent said path downstream of said predetermined portion.

9. The apparatus of claim 1, wherein said attaching means comprises a channel and means for moving said channel between two positions in one of which the channel directs the leader of a web from said path to the collecting device on one of said holders and in the other of which the channel directs the leader of a web from said path to the collecting device on the other of said holders.

10. The apparatus of claim 9, wherein each of said collecting devices has a slotted core and said channel is arranged to direct the leaders of webs into the slots of such cores.

11. The apparatus of claim 1, further comprising means for operating said advancing means, said guide means, said locating means and said attaching means in a predetermined sequence.

12. Apparatus for replacing in a copying machine rolls of photographic films which are spliced together end-to-end into elongated webs, comprising first and second supports arranged to respectively carry and pay out discrete rolls of convoluted webs and to maintain the rolls thereon in a common plane; guide means defining an elongated path which extends through the copying machine; means for advancing the leaders of webs along said path; first and second holders for rotary web collecting devices downstream of said path; means for attaching the leaders of webs to collecting devices on said holders so that the collecting devices can draw the webs from the path; means for locating the leaders of webs adjacent a portion of said path in the range of said advancing means, comprising a carriage which is pivotable between predetermined first and second positions, said advancing means comprising first and second rotors on said carriage, discrete drive means for each of said rotors, and first and second idler rollers adjacent said carriage, said first rotor and said first idler roller defining a nip for the leader of a first web in the first position of said carriage and said second rotor and said second idler roller defining a second nip for the leader of a second web in the second position of said carriage; and means for actuating said advancing means so that the leader which is adjacent said portion of said path is automatically advanced along said path to said attaching means when the collecting device on one of said holders has completed the collection of a web.

13. The apparatus of claim 12, wherein said drive means include means for rotating said first rotor in a clockwise direction and means for rotating said second rotor in a counterclockwise direction.

14. The apparatus of claim 12, wherein said locating means further comprises means for yieldably maintaining said carriage in each of said positions.

15. The apparatus of claim 14, wherein said carriage is pivotable through a dead-center position and said maintaining means includes a resilient element which urges said carriage to said first position when the carriage is pivoted from the second position and beyond the dead-center position, and to said second position when the carriage is pivoted from the first position and beyond the dead-center position.

16. The apparatus of claim 12, wherein said locating means further comprises means for pivoting said carriage.

17. Apparatus for replacing in a copying machine rolls of photographic films which are spliced together end-to-end into elongated webs, comprising first and second supports arranged to respectively carry and pay out discrete rolls of convoluted webs and to maintain the rolls thereon in a common plane; guide means defining an elongated path which extends through the copying machine; means for advancing the leaders of webs along said path; first and second holders for rotary web collecting devices downstream of said path; means for attaching the leaders of webs to collecting devices on said holders so that the collecting devices can draw the webs from the path; means for locating the leaders of webs adjacent a portion of said path in the range of said advancing means, said locating means comprising a mobile carriage and said advancing means comprising first and second rotors on said carriage and means for rotating said rotors in opposite directions at a first speed and independently of each other; means for rotating the collecting devices on said holders at a second speed higher than said first speed; and means for actuating said advancing means so that the leader which is adjacent said portion of said path is automatically advanced along said path to said attaching means when the collecting device on one of said holders has completed the collection of a web.

18. The apparatus of claim 17, wherein said rotors include driven shafts, wheels on said shafts, and one-way clutches between said shafts and the respective wheels so that said wheels can be driven at said first speed in response to rotation by the respective shafts and at said second speed when rotated by webs which are drawn by the collecting means on said holders.

19. Apparatus for replacing in a copying machine rolls of photographic films which are spliced together end-to-end into elongated webs, comprising first and second supports arranged to respectively carry and pay out discrete rolls of convoluted webs and to maintain the rolls thereon in a common plane; guide means defining an elongated path which extends through the copying machine; means for advancing the leaders of webs along said path; first and second holders for rotary web collecting devices downstream of said path; means for attaching the leaders of webs to collecting devices on said holders so that the collecting devices can draw the webs from the path, said attaching means comprising discrete levers for said holders and means for pivoting said levers between spaced-apart first and second positions in which said levers are respectively adjacent a portion of said path ahead of said holders and second positions in which the levers are adjacent the collecting devices on the respective holders, each of said levers having a gripper which is actuatable to engage the leader of a web in the first position of the respective lever and to release the leader of the web in the second position of the respective lever; means for locating the leaders of webs adjacent a portion of said path in the range of said advancing means; and means for actuating said advancing means so that the leader which is adjacent said portion of said path is automatically advanced along said path to said attaching means when the collecting device on one of said holders has completed the collection of a web.

20. The apparatus of claim 19, wherein each collecting device comprises a takeup reel having a hub arranged to be driven by the respective holder and provided with means for engaging the leader of a web in response to pivoting of the respective lever from the first to the second position.

21. The apparatus of claim 20, wherein each reel further includes two flanges flanking the respective hub and each of said hubs has a flat which is substantially parallel to the axis of the respective reel, each of said engaging means including a protuberance provided on one of the flanges, spaced apart from the respective flat and extending toward the other of the flanges, the other flange having a recess which confronts said protuberance so that a web which is trained over said protuberance is free to enter said recess and to move into engagement with the flat and to be overlapped by the protuberance.

22. The apparatus of claim 21, further comprising means for rotating said holders and the collecting devices thereon so that a web which is overlapped by the protuberance of the respective engaging means is convoluted onto the corresponding hub and surrounds the protuberance in response to rotation of the corresponding takeup reel.

23. The apparatus of claim 19, wherein each of said grippers comprises a tongs including a magnet arranged to open and close said tongs.

24. The apparatus of claim 23, wherein the magnet is an electromagnet.

25. Apparatus for replacing in a copying machine rolls of photographic films which are spliced together end-to-end into elongated webs, comprising first and second supports arranged to respectively carry and pay out discrete rolls of convoluted webs and to maintain the rolls thereon in a common plane; guide means defining an elongated path which extends through the copying machine, said guide means including a portion which is movable to and from an operative position adjacent the respective portion of said path; means for advancing the leaders of webs along said path; first and second holders for rotary web collecting devices downstream of said path; means for attaching the leaders of webs to collecting devices on said holders so that the collecting devices can draw the webs from the path; means for locating the leaders of webs adjacent a portion of said path in the range of said advancing means; means for actuating said advancing means so that the leader which is adjacent said portion of said path is automatically advanced along said path to said attaching means when the collecting device on one of said holders has completed the collection of the web; means for operating said advancing means, said guide means, said locating means and said attaching means in a predetermined sequence, said operating means being arranged to assume a condition of readiness on placing of a roll onto one of said supports while the web of the roll on the other of said supports advances along said path; and means for monitoring the web in said path and for generating signals on detection of the trailing end of the monitored web, said operating means being responsive to said signals to move said portion of said guide means to operative position and to start said advancing means so as to advance the leader of a web from said locating means along said path and toward said attaching means as well as to actuate said attaching means so that the latter affixes the leader of the web to the collecting device on one of said holders.

* * * * *